United States Patent [19]

Kerin, Jr.

[11] Patent Number: 4,911,198

[45] Date of Patent: Mar. 27, 1990

[54] SECURING SYSTEM FOR AUTOMATICALLY OPERATED VALVE SYSTEMS

[75] Inventor: Charles P. Kerin, Jr., New Castle, Del.

[73] Assignee: Philadelphia Control Systems, Inc., Wilmington, Del.

[21] Appl. No.: 377,544

[22] Filed: Jul. 10, 1989

[51] Int. Cl.⁴ ............................................. F16K 35/00
[52] U.S. Cl. ...................................... 137/385; 137/15; 251/91; 251/129.04
[58] Field of Search .................... 137/385, 15, 315; 251/89, 91, 90, 129.04

[56] References Cited

U.S. PATENT DOCUMENTS

| | | | |
|---|---|---|---|
| 28,495 | 1/1818 | Wilson | 137/385 |
| 665,133 | 1/1901 | Riggs | 251/129.04 |
| 812,021 | 2/1906 | Dahl | 137/385 |
| 1,322,721 | 11/1919 | Noonan | 251/91 |
| 1,444,899 | 2/1923 | Authier | 251/91 |
| 1,793,926 | 2/1931 | Green | 251/89 |
| 2,072,314 | 3/1937 | Rhodes | 251/129.04 |
| 3,333,160 | 7/1967 | Gorski | 251/129.04 |

Primary Examiner—A. Michael Chambers
Attorney, Agent, or Firm—Neil F. Markva

[57] ABSTRACT

The securing system includes a device and a method for securing a valve assembly in either an open or closed operational position. The automatically operated valve assembly opens and closes a transmission line to flow upon rotation of a rotatable shaft member. The valve assembly is connected to receive remotely transmitted control signals for operating the rotatable shaft member. A flattened circumferential section is located on the rotatable shaft and a locking clip member includes a flattened surface section. The shaft member is externally accessible by the manually operated locking clip which fits around the rotatable shaft in a stationary locking position where the flattened circumferential section is contiguously disposed against the flattened surface section of the locking clip element. An anchoring mechanism secures the locking clip element in the stationary locking position so that the rotation of the shaft member is prevented. Thus, any remotely transmitted control signals designed to operate the valve assembly are overridden by the locking clip element to prohibit opening or closing of the transmission line to flow.

20 Claims, 2 Drawing Sheets

SECURING SYSTEM FOR AUTOMATICALLY OPERATED VALVE SYSTEMS

FIELD OF THE INVENTION

This invention relates to a lockout device to maintain a valve mechanism in either an open or closed position to maintain or stop flow in a transmission line. More particularly, this invention relates to the use of a mechanical lockout device for precluding operation of an automatically operated valve unit controlling flow in a transmission line.

BACKGROUND OF THE INVENTION

With the advent of remote actuation of valve units by computer or manual control, there is a need to prevent operation of such valve units during repair and maintenance thereof. Chemical and petrochemical plants frequently require isolation of portions of the pipeline to service the pipeline or adjust the pipeline system. Locking out the remotely controlled valve means in a closed position within the pipeline allows for safe maintenance operations without having to shut down the entire system.

Likewise, silo or grain elevators frequently need to be entered by personnel for maintenance reasons. The operator of such a facility may not know that maintenance personnel is in the silo and could easily fill the silo with whatever product is normally stored therein. The maintenance workmen would then be inundated by this product within the silo. If the blower or conveyor for discharging material were equipped with an appropriate lockout device, no product could be moved and the problem would be avoided.

Gas, water and oil pipelines use automatic valves and pumps for distributing product throughout their respective systems. When a branch of any system needs to be worked on, the valve, pump or compressor supplying the pipeline branch needs to be isolated so that it cannot be accidentally activated from a terminal remotely located from the site of the pipeline branch. In this particular situation, it is imperative that such a mechanical lockout capability be made available because modern telemetry permits actuation of the valves, pumps or compressors at distances hundreds of miles away from the controller. Thus, an action might go unnoticed until well after a disaster has occurred along a particular pipeline.

Furthermore, large high voltage electrical switches for power distribution systems are remotely actuated from central control rooms. If these switches could be locked out with a mechanical device, work could then be done on branch lines with complete safety because any control signals from the remotely located control room could be overridden by a sound mechanical clip configuration.

Short of shutting down a process or placing redundant manual valves on either side of a remotely controlled automatic valve, it has been unsafe to open a pipeline or vessel while the particular process taking place in the transmission line was in operation. Similarly, pumps, blowers, conveyors and other devices actuated by rotation of a shaft member have made safe isolation of parts or sections impractical. These devices share several points in common. First they are either electrically, pneumatically or hydraulically powered and are actuated at some remote location. Second, they involve rotation to provide an action which is not desired for safe work. A physical mechanical restraint would prevent action or operation of the rotatable member thereby locking the system into a desired operational condition.

Reliable electrical isolation is not always possible due to the growth space design of an operational system. In the improvement of a system, space may not permit lockable manual valves to be installed on either side of the automatic valve. Furthermore, cost may be prohibitive for automating the system to automatically close down under maintenance conditions.

Known lockout clips found in the prior art are related particularly to manually operated valve systems. U.S. Pat. 441,190; 3,540,481; and 3,741,519 disclose various spring-loaded lockout clips and pins for manually operated valves. With the disclosed clips, the manually operated valves are fixed in place once the spring-loaded pin is set within the detent formed in the respective valve stem configuration.

U.S. Pat. Nos. 1,450,861 and 3,560,130 disclose various types of manually displaced pins that extend through a stem configuration of respective manually operated valves.

U.S. Pat. Nos. 988,378; 1,322,721; and 1,444,899 show various types of U-shaped or collar type clip members for preventing the accidental rotation of the disclosed manually operated valve structure. No mechanical lockout clip devices are found in the prior art for securing automatically remote controlled valve units disposed in either an open or closed position within a transmission line.

PURPOSE OF THE INVENTION

The primary object of this invention is to provide a manually operated mechanical lockout clip mechanism for use in all types of automatically operated processing facilities thereby permitting safe partial shut down of equipment for adjustment or repair.

Another object of the invention is to provide a mechanical manually operated locking clip means for use in maintaining a particular operating condition in an automatically operated valve means to override control signals from a remote control terminal.

A still further object of the invention is to provide a securing device for use in a remotely controlled valve means for maintaining a flow in a transmission line in either an open or closed position for purposes of testing and maintenance.

Another object of the invention is to provide a securing system for overriding control signals from a remote location to maintain an automatically operated valve means in the closed position to prevent flow within a transmission system.

Still another object of the invention is to provide a manually operated mechanical lockout means to preclude the necessity of having to install manual valves on either side of a section of pipeline used in a processing system.

A still further object of the invention is to provide a mechanical lockout means that may be adapted to lockout automatically operated pumps, blowers, conveyors and other devices activated by a rotating shaft while maintaining a safe isolation of sections of a processing system.

SUMMARY OF THE INVENTION

The invention is directed to a securing device for automatically controlled valve means having a rotatable shaft means for opening and closing a transmission line to flow within said line. The valve means is connected to receive remotely transmitted control signals to rotate the shaft means.

The securing device comprises a manually operated locking clip means including a flattened surface section. The shaft means is externally accessible and includes a flattened circumferential section. Anchoring means secure the locking clip means in a stationary locking position when the flattened circumferential section is contiguously disposed against the flattened surface section. The automatically operated valve means is positively locked into either an open position or a closed position when the locking clip means is in the stationary locking position. Thus, rotation of the shaft means is prevented by overriding any remotely transmitted control signals to rotate the shaft means.

In a specific embodiment, the valve means includes a valve unit operatively disposed to open and close the transmission line to flow. Drive means rotates the shaft means which in turn actuates the opening and closing assembly. Control means activates the drive means which is spaced from the valve unit and rotates the rotatable shaft that is coupled to the valve unit.

A feature of the invention is directed to the locking clip means which includes a bifurcated U-shaped clip element having two leg members with facing surfaces and extending outwardly from a gripping section. The leg members are spaced with respect to each other by an amount sufficient to allow the shaft means to be disposed between the facing surfaces of the leg members when the locking clip means is in a stationary locking position. At least one of the facing surfaces includes the flattened surface section which is contiguously disposed against the flattened circumferential section of the shaft member when the locking clip means is in the stationary locking position.

A specific embodiment of this feature is directed to a clip element having two leg members extending outwardly from one side of the clip element. Each leg member includes a flattened surface section facing inwardly with respect to a longitudinal axis of the clip element. The flattened surface sections are adapted to contiguously abut a selected flattened circumferential section on the shaft means. The clip member is U-shaped with the facing flattened surface sections being substantially parallel with respect to each other. The leg members are spaced from each other by an amount sufficient to abut the fattened surface sections with flattened circumferential sections on opposing sides of the shaft member.

Another feature of the invention is directed to the specific configuration of a leg member that includes a pin extension. The securing means includes aperture means for receiving the pin extension thereby fixing the clip element in a stationary locking position. In a specific embodiment of this feature, the securing means includes plate means fixedly disposed a spaced distance from one side of the rotatable shaft member. The securing means further includes coupling means operatively engageable with the pin extension to thereby fix the clip element in the stationary locking position.

In another feature of the invention, the clip element has two leg members with one of the leg members having the pin extension and the other leg member having a rigid abutment means. The securing means includes first and second means fixedly disposed a spaced distance from the rotatable shaft means to respectively and operatively engage the pin extension and the rigid abutment means extension means thereby fixing the clip element in a stationary locking position.

In a particular embodiment of the locking clip means, a clip element has two leg members extending outwardly from one side of a gripping section. Facing flattened surface sections of the two leg members are substantially parallel with respect to each other. The first securing means includes receiving means which engage the pin extension and the second securing means includes leg bearing means which adjoins the rigid abutment means extension. Thus, the first and second securing means thereby prevent any rotational movement of the rotatable shaft member.

A more specific feature of this embodiment provides means for interlocking the rigid abutment means extension to the leg bearing means to preclude removal of the clip element from its stationary locking position. The rigid abutment means includes a flat adjoining bearing surface and a first interlock opening. The leg bearing means includes a second interlock opening which is registered with the first interlock opening when the flat adjoining bearing surface is juxtaposed the leg bearing means.

The means for interlocking includes at least one padlock device for locking in place a solid pin element extending through the first and second interlock openings. This may involve a single padlock device or a standard multilock device which in turn is used to receive a single padlock. The use of a single padlock allows a supervisor or single individual to be certain that a system is locked out until he removes the lockout device. The use of a multilock device allows for multiple locks to be installed. This prevents a single individual from opening a valve that would effect multiple people or operations in a plant.

Another feature of the invention provides a combination of structural elements in a automatic valve assembly including remotely controlled valve means for controlling flow in a line. Rotatable drive shaft means connect the valve means to drive means for opening and closing the line to flow therein. The combination comprises a rotatable shaft member having at least one flattened circumferential section externally manually accessible with respect to the valve assembly.

Manually operated locking clip means include a flattened surface section adapted for contiguous disposition in a stationary locking position against the flattened circumferential section of the shaft member. Anchoring means secures the locking clip means in the stationary locking position to prevent rotation of the rotatable shaft. The valve assembly includes control means and a valve unit operatively disposed to open and close the line to flow upon rotation of the shaft member. The control means is spaced from the drive means of the assembly and coupled to the rotatable shaft member for actuating the drive means.

In a specific embodiment of this feature, the drive means comprises an air-operated drive motor coupled at one side thereof to a valve unit via the rotatable shaft member. The control means includes a limit switch spaced from the other side of the drive motor opposite the valve unit and coupled to the shaft member. The limit switch housing is fixedly connected to the drive motor housing by a mounting bracket member at a spaced distance sufficient to allow the manual insertion of the locking clip means into the stationary locking position between the limit switch and the drive motor.

Another specific feature of the invention is directed to a locking clip element having two leg members extending outwardly from one side of a manual gripping section. Each leg member includes a flattened surface section facing inwardly with respect to each other and being adapted to abut a selected flattened circumferential section on the rotatable shaft member. The flattened circumferential section is spaced inwardly from a coupling assembly which connects the limit switch to an outer free end of the shaft member. One of the leg members includes a pin extension and the other leg member includes a rigid abutment means extension having a flat adjoining bearing surface with an interlock opening therein. The mounting bracket member includes a wall section extending between the limit switch and drive motor and includes two laterally spaced apertures. One of the apertures is adapted to receive the pin extension and the other of the apertures is adapted to be registered with the interlock opening when the flat adjoining bearing surface is juxtaposed the bracket member wall section.

In another feature of the invention, fastening means connect respectively inwardly directed bracket elements of the mounting bracket to the limit switch and the drive motor. When in its stationary locking position, the clip element precludes removal of fastening means at the same time that it prevents rotation of the rotating shaft member.

The method of the invention comprises securing an automatic valve means in either an open or closed operational position wherein the valve means is operated by a rotatable drive shaft member. The method includes providing a flattened circumferential section on the rotatable shaft and a locking clip means housing a flattened surface section. The flattened surface section is then manually contiguously disposed against the flattened circumferential section to place the locking clip means in a stationary locking position. The locking clip means is then anchored for securing the rotatable shaft member when the clip means is in the stationary locking position. This arrangement precludes any operation of the valve means from a remote controlling terminal. The anchoring step includes padlocking the locking clip means in place within the stationary locking position.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DETAILED DESCRIPTION OF THE INVENTION

Figure 1:
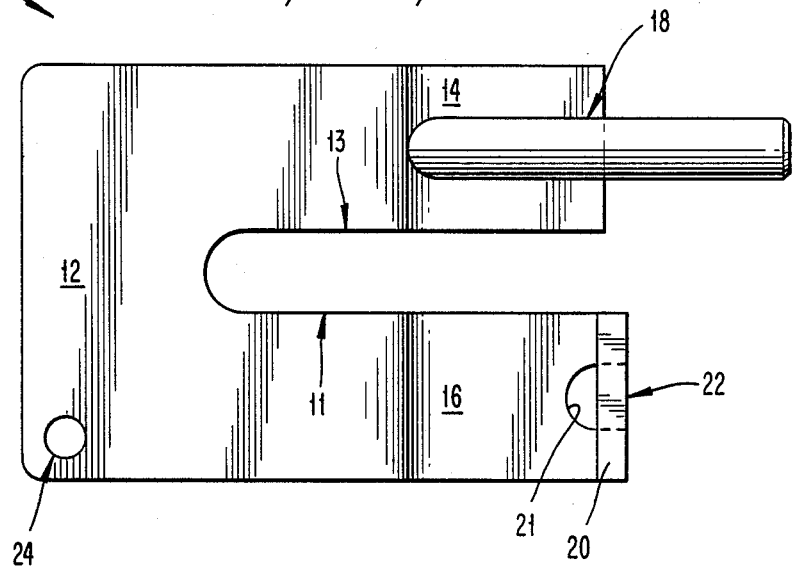
FIG. 1 is a top plan view of a locking clip element made in accordance with this invention.
Figure 2:
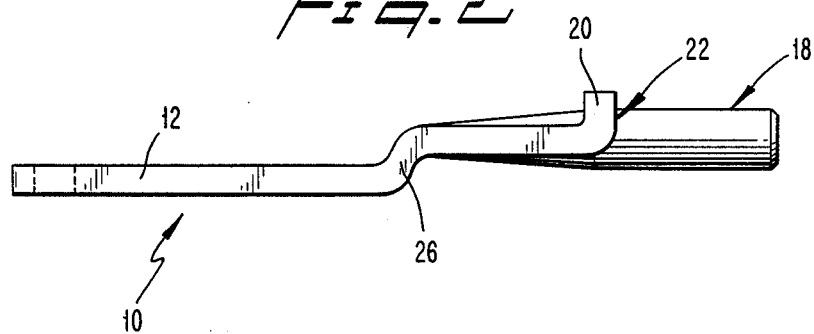
FIG. 2 is a side elevational view of the clip element of FIG. 1.
Figure 3:
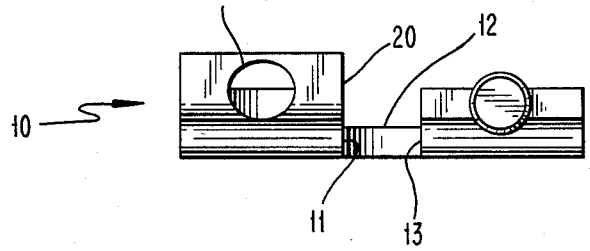
FIG. 3 is a front elevational view of the clip element of FIG. 1.

Clip element, generally designated 10, is U-shaped with a bifurcated section including leg members 14 and 16 with respective facing surface sections 11 and 13 extending outwardly from a gripping section 12. Leg members 14 and 16 are spaced with respect to each other by an amount sufficient to allow the shaft member 40 to be disposed between surface sections 11 and 13 which face inwardly toward the longitudinal axis of clip element 10. One of the leg members 14 includes a pin extension 18 and the other leg member 16 includes a rigid abutment extension 20 having a flat adjoining bearing surface 22 with an interlock opening 21 therein.

Figure 4:
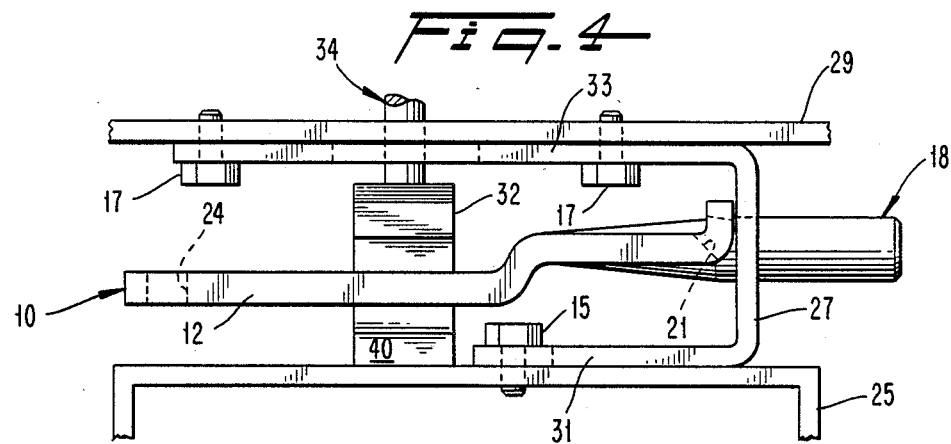
FIG. 4 is a fragmentary side elevational view of a valve assembly having a securing device made in accordance with this invention.

Referring to FIG. 4, clip element 10 is shown substantially in a stationary locking position within a bracket member, generally designated 19, which supports limit switch 29 above an air-operated drive motor 25. Bracket 19 is connected to the respective housings of the limit switch 29 and drive motor 25. Fastening members 17 connect inwardly directed bracket element 33 to the housing of limit switch 29 and fastening elements 15 connect inwardly directed bracket element 31 to housing of air-operated drive motor 25.

Bracket member 19 provides a space for making a rotatable shaft member 40 externally accessible with respect to the manually operated locking clip element 10. Rotatable shaft 40 includes flattened circumferential sections 36 and 38 which engage respective flattened surface sections 13 and 11. When locking clip element 10 is in a stationary locking position as shown in FIG. 4, aperture 30 is adapted to receive pin extension 18 and the other aperture 28 is adapted to be registered with the interlock opening 21 when flat adjoining bearing surface 22 is juxtaposed bracket member wall section 27.

Figure 5:
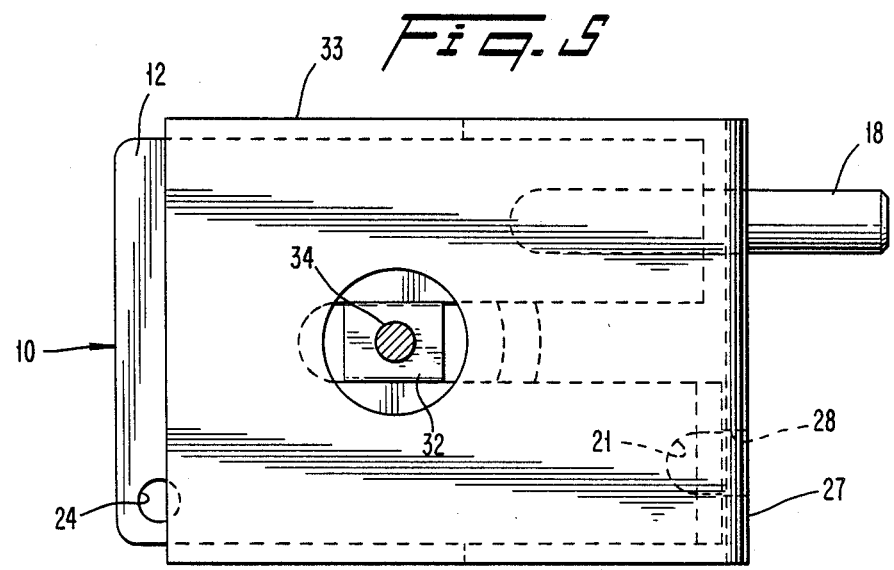
FIG. 5 is a top plan view of the assembly of FIG. 4.
Figure 6:
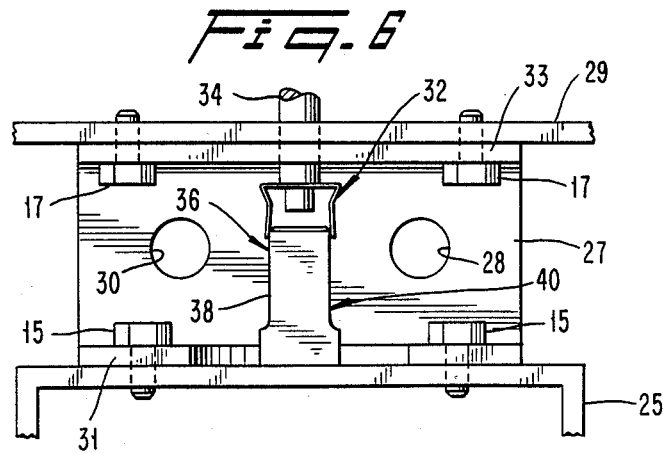
FIG. 6 is a fragmentary front elevational view of the assembly of FIG. 4 with the locking clip element removed for purposes of clarity.

Coupling assembly 32 connects limit switch 29 to the outer end of shaft member 40 as shown. Mounting bracket wall section 27 extends between limit switch 29 and drive motor 25 and includes two laterally spaced apertures 30 and 28. Bracket member 19 mounts limit switch 29 fixedly to the drive motor at a spaced distance sufficient to allow the manual insertion of locking clip member 10 as shown in FIGS. 4 and 5.

In the stationary locking position, flattened circumferential sections 36 and 38 are adapted for contiguous disposition against the flattened surface sections 13 and 11 of the locking clip element 10. Depending on which circumferential sections 36 and 38 are contacting surface sections 11 and 13, it may be possible for the transmission line to be either opened or closed to flow therethrough.

When limit switch shaft 34 rotates upon receiving control signals from a remote location, clip element 10 maintains rotatable shaft 40 in a fixed position by mechanically overriding the control signals. Leg members 14 and 16 include an offset bend section 26 so that pin 18 and abutment section 20 can be aligned with respective apertures 30 and 28. In other words, d depending upon the rotational position of shaft member 40, the valve assembly of the invention may be locked in either an open or closed condition regarding flow in the transmission line.

Opening 24 in gripping section 12 allows for a chain to be attached to keep clip element 10 at the valve site. Whenever a workman requires the valve to be fixed in a lockup position, it is simply a matter of manually disposing flattened surface sections 11 and 13 contiguously against flattened circumferential sections 36 and 38 so that locking clip element 10 is in the stationary locking position. Bracket member 19 provides the necessary anchoring means for securing rotatable shaft member 40 thereby precluding any operation of the valve means from a remote controlling terminal.

Offset bend section 26 is necessary in this embodiment so that legs 14 and 16 are in a different plane than gripping section 12. Thus, clip element 10 may be firmly fixed on rotatable control shaft 40 without interfering with the coupler assembly 32 as shown. While lockout clip element 10 has been shown to be disposed between limit switch 29 and air-driven motor 25, with minor alternations, clip element 10 may be effective for attachment to rotatable shaft 40 between air-driven motor 25 and valve unit (not shown) which controls the open and closed condition for flow within the transmission line. The valve unit is located on the side of motor 25 opposite limit switch 29.

Once clip element 10 is in the stationary locking position, the single pin element of a padlock may be inserted through aligned openings 21 and 28 to keep clip element 10 from un authorized removal. A known multilock device may also be used when necessary to provide for the safety of more than one individual working on the system. With a multilock device, all of the involved people need to unlock the valve before it can be reactivated. This is a common safety practice within the maintenance and repair field.

Neither the padlock nor multilock device is required to contribute to the structural considerations of immobilizing the rotatable shaft 40. Such padlock or multilock device is only necessary to prevent removal of clip element 10 from the system by the authorized individuals who have locked out the valve assembly. A bolt with a nut may be used to accomplish the same result as a padlock or multilock device.

With the specific embodiment as shown in the present application, bracket member 19 is shown with two drilled holes 28 and 30. No significant loss of structural integrity occurs in bracket member 19 for supporting limit switch 29 adjacent air-driven motor 25 regardless of the presence of drilled holes 28 and 30.

The most significant aspect of the assembly of this invention is that rotatable shaft member 40 is totally immobilized. Because of the structure of clip element 10 and cooperative relationship with anchoring bracket member 19, shaft 40 is unable to move even one degree. Such result is extremely important where line pressures reach up to 1500 psi in pipelines carrying highly toxic and abrasive chemical materials. Such total immobilization is also important where it is desired that absolutely no electrical charge passes through an electrical system due to an accidental turning on of power through rotation of a control shaft 40. With the invention as disclosed herein all types of processing facilities may be repaired through a safe partial shut-down of the equipment.

While the securing system for automatically operated valve systems has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A securing device for automatically operated valve means having a rotatable shaft means for opening and closing a transmission line to flow within said line wherein said valve means is connected to received remotely transmitted control signals to operate said valve means by rotating said shaft means, said securing device comprising:
   (a) manually operated locking clip means including a flattened surface section,
   (b) the shaft means being externally accessible and including a flattened circumferential section adapted for continuous disposition against the flattened surface section of the locking clip means, and
   (c) anchoring means for securing the locking clip means in a stationary locking position when the flattened circumferential section is contiguously disposed against the flattened surface section,
   (d) said automatically operated valve means being positively locked into either an opened position or a closed position when the locking clip means is in said stationary locking position to prevent rotation of the rotatable shaft means thereby overriding any remotely transmitted control signals to operate the valve means.

2. A securing device as defined in claim 1 wherein said valve means include a valve unit operatively disposed to open and close the transmission line to flow, drive means for rotating the rotatable shaft means which actuates the opening and closing of the valve unit, and control means for activating said drive means,
said drive means being spaced from the valve unit and having the rotatable shaft coupled to the valve unit.

3. A securing device as defined in claim 1 wherein the locking clip means includes a bifurcated clip element having leg members with facing surfaces and extending outwardly from a gripping section,
said leg members being spaced with respect to each other by an amount sufficient to allow the shaft means to be disposed between said facing surfaces of the leg members when the locking clip means is in said stationary locking position,
at least one of the facing surfaces includes said flattened surface section which is contiguously disposed against the flattened circumferential section when the locking clip means is in said stationary locking position.

4. A securing device as defined in claim 1 wherein the locking clip means includes a gripping section and at least one leg member extending outwardly from the gripping section and including said flattened surface section, and
the anchoring means includes fixedly disposed securing means adapted to cooperate with said leg member to fix the locking clip means in said stationary locking position.

5. A securing device as defined in claim 4 wherein the locking clip means includes a clip element having two leg members extending outwardly from one side of the clip element with each leg member including a flattened surface section facing inwardly with respect to a longitudinal axis of the clip element, each of said flattened surface sections being adapted to contiguously abut a selected flattened circumferential section on said shaft means.

6. A securing device as defined in claim 5 wherein the clip member is U-shaped with the facing flattened surface sections of the two leg members being substantially parallel with respect to each other,
said leg members being spaced from each other by an amount sufficient to abut said flattened surface sections with flattened circumferential sections on opposing sides of the shaft means.

7. A securing device as defined in claim 4 wherein said leg member includes a pin extension, and
said securing means includes aperture means for receiving the pin extension thereby fixing the locking clip means in said stationary locking position.

8. A securing device as defined in claim 4 wherein said leg member includes a pin extension, and
said securing means includes plate means fixedly disposed s space distance from one side of the shaft means and including coupling means operatively engageable with said pin extension to thereby fix the locking clip means in said stationary locking position.

9. A securing device as defined in claim 4 wherein there are two leg members with one of the leg members having a pin extension and the other leg member having a rigid abutment means extension,
said securing means includes first and second means fixedly disposed a space distance from the shaft means to respectively and operatively engage the pin extension and the rigid abutment means extension to thereby fix the locking clip means in said stationary locking position.

10. A securing device as defined in claim 9 wherein the locking clip means includes a clip element having a gripping section with the two leg members extending outwardly from one side of the gripping section and each having a flattened surface section facing each other,
said facing flattened surface sections of the two leg members being substantially parallel with respect to each other,
said first securing means includes receiving means which engage the pin extension, and
said second securing means includes leg bearing means which adjoins the rigid abutment means extension,
said first and second securing means thereby preventing any rotation movement by the shaft means.

11. A securing device as defined in claim 10 wherein said rigid abutment means extension includes means for interlocking the rigid abutment means extension to the leg bearing means to preclude removal of the clip element from the shaft means.

12. A securing device as defined in claim 11 wherein the rigid abutment means extension includes a flat adjoining bearing surface and a first interlock opening, and
said leg bearing means includes a second interlock opening which is registered with the first interlock opening when the flat adjoining bearing surface is juxtaposed the leg bearing means.

13. A securing device as defined in claim 12 wherein the means for interlocking includes at least one padlock device for locking in place a solid pin element extending through the first and second interlock openings.

14. In an automatic valve assembly including remotely controlled valve means for controlling flow in a line and rotatable drive shaft means connecting a valve unit to drive means for opening and closing the line to flow therein, the combination comprising:
(a) said drive shaft means including a rotatable shaft member having at least one flattened circumferential section externally manually accessible with respect to the valve assembly,
(b) manually operated locking clip means including a flattened surface section adapted for contiguous disposition in a stationary locking position against the flattened circumferential section of the shaft member, and
(c) anchoring means for fixing the locking clip means in said stationary locking position to prevent rotation of the rotatable shaft member.

15. The combination as defined in claim 14 wherein said valve means includes control means with the valve unit operatively disposed to open or close the line to flow upon rotation of said shaft member, and
said control means being spaced from the drive means and coupled to the rotatable drive shaft member for activating the drive means.

16. The combination as defined in claim 15 wherein said drive means includes an air-operated drive motor coupled at one side thereof to the valve unit via the shaft member,
said control means includes a limit switch spaced from the other side of the drive motor opposite the valve unit and coupled to said shaft member, and
a mounting bracket member fixedly connects said limit switch to the drive motor at a spaced distance sufficient to allow the manual insertion of the locking clip means into said stationary locking position between the limit switch and the drive motor.

17. The combination as defined in claim 16 wherein said locking clip means includes a clip element having a manual gripping section and two leg members extending outwardly from one side of the gripping section,
each said leg member includes a flattened surface section facing inwardly with respect to each other and being adapted to abut a selected flattened circumferential section on the shaft member,
said flattened circumferential section being spaced inwardly from a coupling member which connects the limit switch to an outer end of the shaft member,
one of the leg members includes a pin extension and the other leg member includes a rigid abutment means extension having a flat adjoining bearing surface with an interlock opening therein,
the mounting bracket member includes a wall section extending between the limit switch and drive member and including two laterally spaced apertures,
one of said apertures is adapted to receive said pin extension and the other of said apertures is adapted to be registered with said interlock opening when said flat adjoining bearing surface is juxtaposed said bracket member wall section.

18. The combination as defined in claim 17 wherein fastening means connect respective inwardly directed bracket elements of the mounting bracket to the limit switch and the drive motor, and
said clip element precludes removal of said fastening means when it is in its stationary locking position.

19. A method of securing an automatic valve means in either an open or closed operational position wherein said valve means is operated by drive means via a rotatable shaft member, said method comprising:
(a) providing a flattened circumferential section of the rotatable shaft,
(b) providing locking clip means including a flattened surface section,
(c) manually contiguously disposing said flattened surface section of the locking clip means against said flattened circumferential section in a stationary locking position, and
(d) anchoring the locking clip means in said stationary locking position to fix the rotatable shaft member thereby precluding any operation of the valve means from a remote controlling terminal.

20. The method as defined in claim 19 wherein said anchoring step includes padlocking the locking clip means in place.